UNITED STATES PATENT OFFICE.

PAUL W. PRUTZMAN, OF LOS ANGELES, CALIFORNIA, ASSIGNOR TO GENERAL PETROLEUM CORPORATION, A CORPORATION OF CALIFORNIA.

MATERIAL FOR DECOLORIZING OIL AND METHOD OF PRODUCING THE SAME.

1,397,113.

Specification of Letters Patent.

Patented Nov. 15, 1921.

No Drawing.

Application filed January 17, 1921. Serial No. 438,048.

*To all whom it may concern:*

Be it known that I, PAUL W. PRUTZMAN, a citizen of the United States, residing at Los Angeles, in the county of Los Angeles and State of California, have invented a new and useful Material for Decolorizing Oil and Method of Producing the Same, of which the following is a specification.

My invention relates to the art of treatment of oils, being more particularly the production of a material which may be used for the filtration or partial decolorization of mineral, vegetable and animal oils. My invention resides in the production of a material from the mineral montmorillonite for the purposes described. The mineral montmorillonite is characterized by a very fatty, soapy feeling when wet; when dry it is hard and tough. On drying the mineral loses much of its water and cracks into small pieces, and may be reduced by repeated wetting and drying to a mass of small angular fragments.

The color of this mineral ranges from snow white through bright pink to red and chocolate brown with varieties of stone gray, dove gray and greenish gray. The color is due to traces of iron, manganese or other impurities and has no bearing on the value of the material for decolorizing purposes. The most marked characteristic of the mineral is the presence in the paler layers of black specks or nodules of manganese dioxid which are often surrounded by a pale rose color. Layers without these manganese specks usually accompany the nodular mineral and are of equal value in the decolorization of oils.

The method of producing the decolorization material is as follows:

The mineral as taken from the earth, or after drying, is pulverized. This step is not essential to the success of the process as the mineral may be mixed with water in any convenient manner, but previous pulverizing increases the effectiveness of the water treatment. The mineral after being pulverized is mixed with water to a fairly stiff paste. Acid is now added. This may be any strong mineral acid, but sulfuric acid of 66° Baumé or about 94% strength is the most convenient and economical. About one-half a pound of such acid per pound of dry mineral is a suitable quantity. The acid is mixed with the mud, that is, the mass formed by mixing the mineral with water, in any convenient manner, and heated by direct or indirect steam or fire until the reaction is complete. This requires several hours. When the reaction is finished the mass is diluted with water and washed with water repeatedly until the soluble portion of the mixture is free from the aluminum salt of the acid used, and from free acid.

The clean mineral residue is then drained or filtered to free it from water and dried at a temperature of about 250° Fahrenheit after which it is ground to a fine powder.

The material so produced is used for the purpose of decolorizing oil by mixing the fine powder with the oil at a temperature of from 150° to 250° Fahrenheit depending upon the characteristics of the oil. It is then permitted to filter or settle out, the result being an oil of lighter color than before the addition of the powder. The degree of loss in color of the oil is proportionate to the quantity of the powder added to the oil and to the care with which the method is followed.

When sulfuric acid is used in the preparation of the decolorizing material aluminum sulfate is produced by the action of the acid on the portion of the mineral which contains aluminum. This by-product may be recovered by concentrating the first wash waters, allowing the aluminum sulfate to crystallize out and draining the crystals.

What I claim is:—

1. The method of producing a decolorizing material for oils which consists in reducing the mineral montmorillonite to a plastic condition, treating the plastic material with acid, washing the acid from the mineral, and pulverizing the mineral so washed.

2. The method of producing a decolorizing material for oil which consists in pulverizing the mineral montmorillonite, mixing the powdered mineral with water to form a stiff paste, treating the paste by adding acid thereto, heating the paste containing the acid, washing the heated material to free the material of soluble matter and acid, drying the washed material and pulverizing the dried material.

3. The method of producing decolorizing material for oils which consists in reducing the mineral montmorillonite to a plastic condition by mixing with water, treating the plastic material with sulfuric acid in the proportion of one-half pound of acid to each pound of dry mineral, washing the free acid from the treated material, and pulverizing the insoluble material.

4. The method of producing a decolorizing material for the treatment of oils which consists in treating the mineral montmorillonite with acids and removing the water soluble constituents of the resulting mixture.

In testimony whereof, I have hereunto set my hand and seal at Los Angeles, California, this 11th day of January, 1921.

PAUL W. PRUTZMAN.